United States Patent [19]

Smith

[11] 4,214,418

[45] Jul. 29, 1980

[54] METHOD OF CONSTRUCTING A THERMAL INSULATION PACKET

[76] Inventor: Stuart B. Smith, 2069 Christian Cir., Conyers, Ga. 30207

[21] Appl. No.: 937,133

[22] Filed: Aug. 28, 1978

[51] Int. Cl.² ............................................. B65B 43/02
[52] U.S. Cl. ...................................... 53/452; 52/232; 52/406; 206/528; 428/921
[58] Field of Search ................. 53/452, 456, 472, 474; 52/406, 232; 206/205, 528; 428/921

[56] References Cited

U.S. PATENT DOCUMENTS

| | | | |
|---|---|---|---|
| 2,939,811 | 6/1960 | Dillon | 52/406 X |
| 3,827,341 | 8/1974 | Stage | 93/35 R |
| 3,855,741 | 12/1974 | Semon | 52/232 |
| 4,015,386 | 4/1977 | Cook | 52/232 |

FOREIGN PATENT DOCUMENTS 543721  3/1977  U.S.S.R. ........................ 52/406

*Primary Examiner*—Travis S. McGehee
*Attorney, Agent, or Firm*—Cushman, Darby & Cushman

[57] ABSTRACT

A method and product relating to a thermal insulation package wherein a container made from laminated sheet material including an inner layer of kraft paper, an outer layer of aluminum foil and an intermediate layer of fiberglass webbing is provided; the three layers are adhesively secured together and the inner surface of the kraft paper is coated with a heat-activated adhesive; the sheet material is formed into a tubular section by overlapping opposite edges of the sheet material and heat sealing the edges together; the tubular section thus formed is subsequently cut into tubular sections of smaller length, the bottoms of each of the smaller sections are then heat sealed, the containers thus formed are filled with polystyrene pellets and a hydrate compound is added; the open end of each of the containers is then closed and heat-sealed to form the completed package.

5 Claims, 3 Drawing Figures

U.S. Patent     Jul. 29, 1980     4,214,418
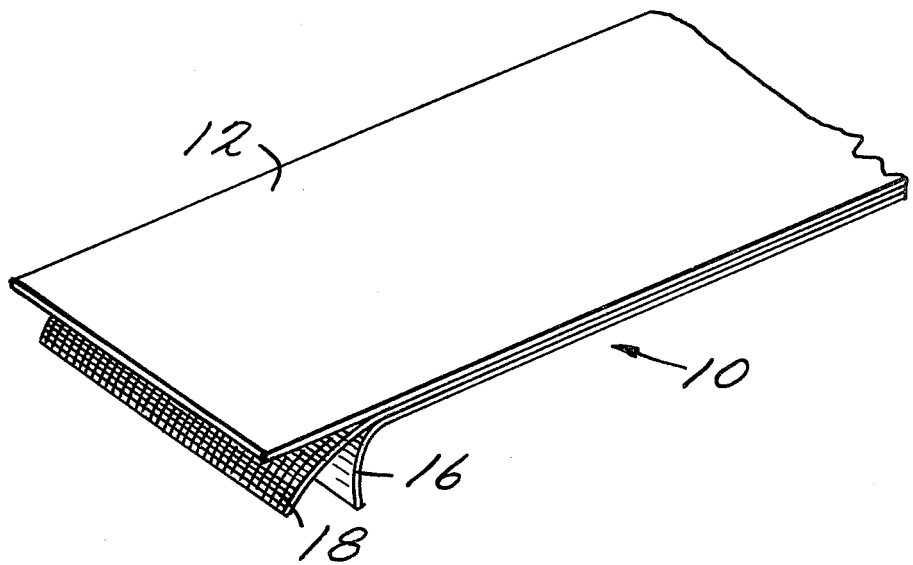
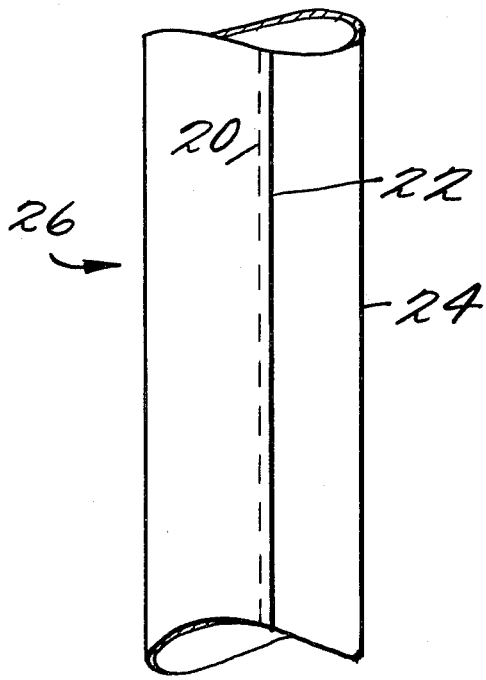
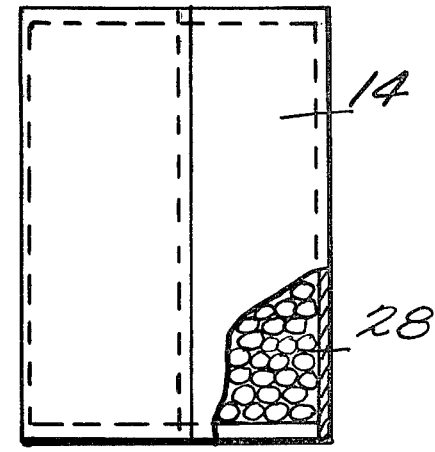

METHOD OF CONSTRUCTING A THERMAL INSULATION PACKET

BACKGROUND AND BRIEF DESCRIPTION OF THE INVENTION

The present invention relates to thermal insulation materials and, move specifically, to a method of making thermal insulation packages or packets and the packages thus produced.

In recent years, it has been widely recognized that the conservation of fuel as used for heating dwellings and other structures can be materially enhanced where the structures are assembled with adequate insulation. However, in both existing and new structures, it has not always been practical to install suitable insulation either due to the difficult in gaining access to the surfaces to be insulated or the unavailability of suitable insulating materials which can be accommodated in an existing structural plan.

Accordingly, it is an object of the present invention to provide a new method of making a type of thermal insulation package and a novel package itself which is characterized by the flexibility of the package, thus rendering it easily adoptable to a wide variety of structural installations. Further, the present invention makes use of scrap materials that result in the cutting and formation of expanded foam panels thus further resulting in a conservation of energy and materials. Additionally, fire retarding means are employed to render the package safe for use in practically all structures.

In summary, the present invention utilizes commercially available sheet material consisting of a layer of kraft paper, a layer of fiberglass webbing and a layer of aluminum foil as the outer wall of the container. The three layers are adhesively secured together and the inner layer of the container, which is the side of the kraft paper opposite the fiberglass webbing, is coated with a heat-activated adhesive, a number of types of which are commercially available on the market. According to the present invention, it is important that the kraft paper be impregnated with a fire-retardant composition such as Surlyn (Dupont trade name) and neoprene waterbased adhesive with Hologins so that the resulting insulation package will comply with fire regulations.

According to the method of the present invention, the sheet material, as noted above, is first formed into a long tube by overlapping two edges of the material and heating them to close the tube. The tubular section is then cut into a plurality of smaller tubular segments and one end of each of smaller segments has its edges heat sealed. Each of the containers is then filled with an expanded foam material such as polystyrene pellets. Another fire retardant means such as a quantity of a hydrate compound is also placed in the containers. The package is completed by closing the open end, again by heat sealing.

By this method, a very inexpensive insulation package capable of being installed in a broad range of structural environments is obtained. Moreover, the packages can be inexpensively manufactured in any desired size to accommodate the broad range of end uses. Most importantly, the package is made permanently fire-retardant which is a primary concern when using polystyrene pellets as a component of the insulation. The metal foil and fiberglass, as well as the adhesive, will give enhanced structural integrity and reinforcement to the package and will also act as as a vapor barrier which is important to the insulating function.

The foregoing and other objects and advantages of the present invention will become apparent as consideration is given to the following detailed description taken in conjunction with the accompanying drawings, in which:

BRIEF DESCRIPTION OF THE DRAWINGS

FIG. 1 is a perspective view of the sheet material used to form the container of the present invention;

FIG. 2 shows the sheet material of FIG. 1 folded and sealed along the edges; and FIG. 3 shows the completed insulation package of the present invention.

DETAILED DESCRIPTION OF THE INVENTION

Refering now to the figures, wherein like numerals designate corresponding parts throughout the several views, there is shown in FIG. 1 a composite laminate sheet material generally designated at 10 which consists of a layer 12 of flexible sheet material such as 30 pound weight kraft paper in the preferred embodiment. The layer of kraft paper 12 will form the inner layer of the completed container which is illustrated at 14 in FIG. 3. The outer layer of the container is a thin sheet of aluminum foil 16, while the intermediate layer is a web which may be woven or non-woven fiberglass fibers 18. The three layers 12, 16 and 18 are adhesively secured together by a suitable commercial adhesive. In addition, the kraft paper 12 is thoroughly impregnated with a fire-retardant composition such as neoprene water emulsion inpregnated with Halogens which is also commercially available.

According to the method of the present invention, the surface of the sheet of kraft paper 12 which forms the interior of the package 14 is coated with a heat-activated adhesive such as Suryln (Dupont trade name). Then, the edges 20 and 22 of the sheet 10 are overlapped as shown in FIG. 2 to form a tubular section 24 which may be of any desired length. Heat is then applied along the overlapped edges 20 and 22 to activate the adhesive and seal the sheet into the sheet into the tubular form.

A cutting tool is then employed as at 26 to cut the tubular section 24 into a plurality of tubular sections of smaller longitudinal length. Thereafter, one end of each of the smaller tubular sections has its edges sealed by applying heat to seal the end in a closed position. Thereafter, each of the tubular sections is filled through its open end with a suitable quantity of polystyrene pellets 28. Also, a quantity of a hydrate compund such as sodium tetraborate is deposited in each package. For each two cubic feet of volume, approximately 0.25 pound of the compound should be sufficient. In the event of a fire or extreme heat, at about 200° F., the hydrate compound will flash to steam and then condense to effectively soak the interior of the container. The container will then function as a fire barrier.

The other end of each of the smaller tubular sections has its edges closed by pressing them together and then heat sealed to form the completed package 14.

It will be seen, therefore, that for a given width of the original sheet material 10, the packages 14 may be of any desired longitudinal length and may be of any desired width up to a limit by selecting the degree of overlap of the edges 20 and 22 as desired.

It is not necessary that the expanded foam element, such as polystyrene pellets be of any particular size and it is preferred that they consist of irregular dimensions such as material that is frequently left over from cutting polystyrene insulation panels as this type of material is already expanded to improve its insulation properties.

Having described the invention, it will be apparent to those skilled in this art that various modifications may be made thereto without departing from the spirit and scope of the invention as defined in the appended claims.

What is claimed is:

1. A method of constructing an insulation packet comprising the steps of:
    (a) adhesively securing together a sheet of metal foil, a sheet of fiberglass fabric and a sheet of paper with the fiberglass fabric located between said sheets of foil and paper to form a composite flexible sheet material, the outwardly facing surface of said paper sheet having a heat-activated adhesive coating thereon,
    (b) forming a first tubular section from said composite sheet material with said heat-activated adhesive-coated surface of said sheet material on the interior of said section and with the edges of said composite sheet overlapping each other along the longitudinal axis of said tubular section,
    (c) applying heat to the said overlapping edges to activate the adhesive and seal the edges together,
    (d) severing the tubular section at a selected point intermediate its ends and generally transverse to its longitudinal axis to form a plurality of smaller tubular sections from said first section,
    (e) closing and sealing one end of a said smaller tubular section to form a container,
    (f) filling said container with an insulation material, and
    (g) closing and sealing the other end of said container.

2. The method as claimed in claim 12, wherein, in step (e), the sealing of said one end is effected by application of heat to edges of said sheet material to activate the adhesive thereon.

3. The method as claimed in claim 2 wherein, in step (g), the sealing of said other end is effected by application of heat to edges of said sheet material to activate the adhesive thereon.

4. The method as claimed in claim 2, further including the step of depositing a quantity of a hydrate compound in said container.

5. The method as claimed in claim 1 including the step of impregnating said paper with a fire-retardant material.

* * * * *